(12) United States Patent
Yamamoto et al.

(10) Patent No.: US 7,455,160 B2
(45) Date of Patent: Nov. 25, 2008

(54) ELECTROMAGNETIC CLUTCH

(75) Inventors: Kiyokazu Yamamoto, Isesaki (JP); Motoaki Yoshida, Kumagaya (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 215 days.

(21) Appl. No.: 11/275,571

(22) Filed: Jan. 17, 2006

(65) Prior Publication Data
US 2006/0157314 A1  Jul. 20, 2006

(30) Foreign Application Priority Data
Jan. 18, 2005  (JP) ............................. 2005-010387

(51) Int. Cl.
  *F16D 27/00*  (2006.01)
  *F16D 37/02*  (2006.01)
  *F16D 19/00*  (2006.01)
(52) U.S. Cl. ................................. 192/84.941
(58) Field of Classification Search ..............................
  192/84.941–84.961, 84.1
See application file for complete search history.

(56) References Cited

U.S. PATENT DOCUMENTS

| | | | |
|---|---|---|---|
| 1,286,615 A | 12/1918 | Hatashita | |
| 1,767,566 A | 6/1930 | Updike | |
| 2,045,227 A | 6/1936 | Hamil | |
| 2,088,979 A | 8/1937 | Stanley | |
| 2,910,846 A | 11/1959 | Butterfield et al. | |
| 3,554,045 A | 1/1971 | Littmann | |
| 4,189,042 A | 2/1980 | Miller | |
| 4,344,306 A | 8/1982 | Citron | |
| 4,694,944 A | 9/1987 | Schmidt | |
| 4,744,447 A | 5/1988 | Kato et al. | |
| 4,757,888 A | 7/1988 | Nakajima | |
| 5,683,299 A * | 11/1997 | Kishibuchi et al. | ............ 464/88 |
| 5,941,357 A | 8/1999 | Tabuchi et al. | |
| 5,944,156 A | 8/1999 | Hatakeyama | |
| 6,332,842 B1 | 12/2001 | Tabuchi et al. | |
| D460,093 S | 7/2002 | Ochiai | |

(Continued)

FOREIGN PATENT DOCUMENTS

DE  4215853 A1  11/1993

(Continued)

OTHER PUBLICATIONS

European Patent Office, European Search Report for Related EP Application No. 06001022 dated Nov. 9, 2006.

*Primary Examiner*—Tisha D Lewis
(74) *Attorney, Agent, or Firm*—Baker Botts L.L.P.

(57) ABSTRACT

An electromagnetic clutch comprises: a drive shaft of a compressor in an air conditioner for a vehicle in which a combustible refrigerant or a $CO_2$ refrigerant circulates; a rotor which is rotated about the drive shaft by receiving a motive power from an engine or a motor of the vehicle; and a torque limiter connected to an armature disposed so as to face the rotor through an elastic member, the torque limiter being rotated integrally with the drive shaft, in which the torque limiter includes a transmission cutting-off portion for, when the state of a lock is caused in the drive shaft, perfectly separating the armature side from the drive shaft side, and for, unless the lock state is released, prohibiting the connection between the armature side and the drive shaft side from being recovered.

9 Claims, 3 Drawing Sheets

U.S. PATENT DOCUMENTS

| | | |
|---|---|---|
| D460,770 S | 7/2002 | Ochiai |
| 6,425,837 B1 | 7/2002 | Ochiai |
| 6,494,799 B1 | 12/2002 | Ochiai |
| 6,932,729 B2 | 8/2005 | Ochiai |
| 7,017,726 B2 * | 3/2006 | Konishi et al. ......... 192/84.961 |
| 7,040,871 B2 * | 5/2006 | Ueda et al. .................. 417/223 |
| 2004/0127294 A1 | 7/2004 | Ohta |

FOREIGN PATENT DOCUMENTS

| | | |
|---|---|---|
| DE | 19740236 A1 | 3/1998 |
| DE | 10030068 A1 | 4/2001 |
| EP | 0702167 A1 | 3/1996 |
| JP | S58001294 U | 1/1983 |
| JP | H08135686 A | 5/1996 |
| JP | H08135752 A | 5/1996 |

* cited by examiner

ADVANCE DIRECTION

ELECTROMAGNETIC CLUTCH

BACKGROUND OF THE INVENTION

1. Field of the Invention

The present invention relates to an electromagnetic clutch for transmitting a motive power of an engine or the like of a vehicle to a drive shaft of a compressor used in an air conditioner for the vehicle.

2. Description of the Related Art

A compressor of this sort is driven, for example, by receiving a motive power of an engine. For this reason, the engine and a drive shaft of the compressor are connected to each other through the motive power transmitting path. The driving force of the engine is transmitted from a driving belt to a pulley and then transmitted from the pulley to the drive shaft of the compressor via an electromagnetic clutch through this motive power transmitting path. More specifically, the electromagnetic clutch includes a rotor which is rotated about the drive shaft. An armature, i.e., a clutch plate, is disposed so as to face the rotor. The rotor attracts the clutch plate by causing a current to flow through an electromagnetic solenoid, thereby transmitting the driving force to the drive shaft.

Here, when galling or the state of a lock is caused in the drive shaft, the driving belt or the like is damaged, which leads to a stop of the engine. Thus, an electromagnetic clutch is disclosed in which the heat generation due to skid of the clutch plate is detected with a thermal fuse or the like and the connection between the clutch plate side and the drive shaft side is cut off. Also, an electromagnetic clutch provided with a torque limiter is disclosed for cutting off connection between the clutch plate side and the drive shaft side when the state of a lock is caused (refer to Japanese Unexamined Patent Publication No. Hei 8-135686 and Japanese Patent Publication No. Sho 58-1294 for example).

Now, in the case of the above-mentioned electromagnetic clutch provided with the fuse or the like, since it takes a certain period of time to detect the skid of the clutch plate, problems such as damage to a housing of the compressor, or transmission of the frictional heat to the housing occur during that period of time, leading to the lowering the sealing property.

In addition, when an elastic member made of rubber or the like is used to perform the function of the above-mentioned limiter in the above-mentioned electromagnetic clutch, changes over time such as reduction in the tension or elastic force of the rubber are feared, and there is a problem that when the drive shaft is in a heavy lock state, it may be difficult to cut off the connection between the clutch plate side and the drive shaft side.

Moreover, in the case of the above-mentioned electromagnetic clutch provided with the torque limiter, the recovery of the connection between the clutch plate side and the drive shaft side is usually tried. That is to say, in addition to the case where the drive shaft is in a light lock state, even in the case where the drive shaft is in a heavy lock state and the heavy lock state is not released, the recovery of the connection between the clutch plate side and the drive shaft side is made. In this case, there is a problem that when an internal component or part of the compressor is damaged along with the recovery of the connection between the clutch plate side and the drive shaft side, the internal component or part is dragged to cause a crack in the housing, and the housing is also damaged.

Here, in recent years, as a refrigerant of the air conditioner for a vehicle, natural refrigerant have been developed and studied from a viewpoint of protection of the ozone layer and prevention of the global warming. A combustible refrigerant such as a $CO_2$ or alternate from HFC-152a can be mentioned as the refrigerant. In particular, in the case of the $CO_2$, the Global Warming Potential (GWP) of the refrigerant is 1. In addition, in the case of the HFC-152a, the GWP of the refrigerant is about 1/10 times as small as that of HFC-134a, which greatly contributes to the reduction of the environment load.

However, when the refrigerant concerned is discharged from the compressor into the atmosphere due to the damage of the housing or the reduction of the sealing property, in the case of the $CO_2$ refrigerant, if a predetermined concentration is exceeded, this may exert a bad influence on the human body. In addition, the combustible refrigerant may catch fire. For this reason, it is necessary to take measures for avoiding the discharge of the refrigerant from the compressor into the atmosphere. However, the prior art does not specially take this point into consideration.

SUMMARY OF THE INVENTION

The present invention has been made in light of the above-mentioned problems, and it is therefore an object of the present invention to provide an electromagnetic clutch which is capable of reliably avoiding the discharge of a refrigerant from a compressor into the atmosphere.

In order to attain the above-mentioned object, there is provided an electromagnetic clutch according to the present invention comprising: a drive shaft of a compressor in an air conditioner for a vehicle in which a combustible refrigerant or a $CO_2$ refrigerant circulates; a rotor adapted to rotate about the drive shaft by receiving a motive power from an engine or a motor of a vehicle; an armature disposed so as to face the rotor; an electromagnetic solenoid for making the rotor attract the armature by causing a current to flow therethrough and transmitting the motive power to the drive shaft; and a torque limiter connected to the armature through an elastic member and adapted to be rotated integrally with the drive shaft, in which the torque limiter is provided with a transmission cutting-off portion for, when the state of a lock is caused in the drive shaft, perfectly separating the armature side from the drive shaft side, and for, unless the lock state is released, prohibiting the connection between the armature side and the drive shaft side from being recovered.

Thus, according to the electromagnetic clutch of the present invention, the torque limiter is provided with the transmission cutting-off portion for, unless the lock state caused in the drive shaft is released, prohibiting the motive power of the engine or motor from being transmitted to the drive shaft. That is, the transmission cutting-off portion perfectly separates the armature side from the drive shaft side to prohibit the connection between the armature side and the drive shaft side from being recovered in the state of the lock. Hence, for example, the damage of the compressor caused by a heavy lock state can be reliably avoided. As a result, even when the combustible refrigerant, the $CO_2$ refrigerant or the like is used as the refrigerant of a refrigerating system, the refrigerant is prevented from being discharged from the compressor into the atmosphere, which contributes to the improvement in the reliability of the refrigerating system.

In addition, preferably, the torque limiter can include: a hub connected integrally with the drive shaft; a flange connected to the hub and extending toward the elastic member; and spherical members provided as the transmission cutting-off portion in the flange for, when the motive power is transmitted, being engaged with both the flange and the elastic member, and for, when the transmission of the motive power is cut off, being released from the engagement with the elastic member, thereby perfectly separating the elastic member from the flange.

In this case, since the torque limiter includes the spherical members for perfectly separating the elastic member from the flange, the influence of changes over time becomes less as compared with the case where the elastic member is used in the torque limiter as in the prior art. Moreover, since the movement of the spherical members allows the transmission of the motive power to be cut off, a change in torque when the transmission phase is changed to the cutting-off phase becomes small.

Moreover, preferably, the torque limiter can include: a hub connected integrally with the drive shaft; a flange connected to the hub and extending toward the elastic member; and a notch portion provided as the transmission cutting-off portion in the flange for, when the transmission of the motive power is cut off, breaking the flange, thereby perfectly separating the elastic member from the flange.

In this case, the torque limiter includes the notch portion for perfectly separating the elastic member from the flange. Hence, the influence of changes over time becomes less and the number of components or parts is reduced as compared with the case where the elastic member is used in the torque limiter as in the prior art.

Furthermore, preferably, the electromagnetic clutch further includes means for detecting the state of connection between the elastic member and the flange, in which when the state of connection between the elastic member and the flange is released, a current is caused to flow through the electromagnetic solenoid so that the rotor attracts the armature.

Thus, when the torque limiter functions, the rotor attracts the armature, thereby avoiding a non-supporting state of the elastic member or the armature after release of the state of connection between the elastic member and the flange. In addition, if continuous flow of a current through the electromagnetic solenoid is detected, it also becomes possible to recognize the release of the state of connection between the elastic member and the flange.

In addition, the means for detecting the connection state can be means for detecting the rotating speed of the drive shaft, means for detecting a change in pressure of the circulating refrigerant, or means for detecting a change in temperature of the circulating refrigerant. As a result, it becomes possible to reliably recognize the release of the state of the connection between the elastic member and the flange by the torque limiter.

Moreover, preferably, the electromagnetic clutch further includes means for displaying to a crew member the connection between the elastic member and the flange is released in response to a release signal provided by the means for detecting the connection state and indicating the release of the state of the connection between the elastic member and the flange. As a result, if the crew member thereby clearly recognizes the release of the connection between the elastic member and the flange, the release of the lock state of the compressor is performed in early stages, and thus the reliability of the refrigerating system is further improved.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
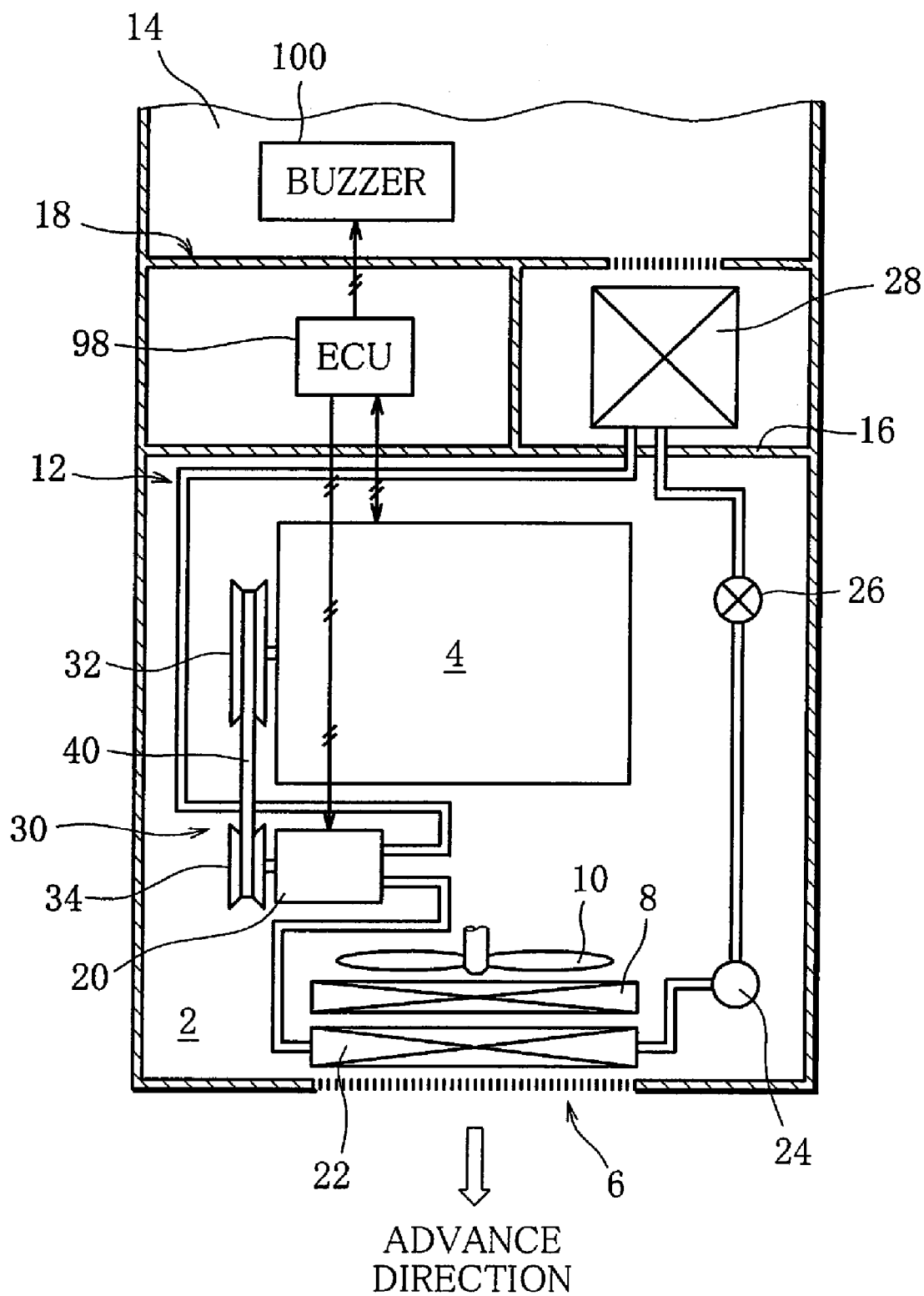
FIG. 1 is a schematic view of an air conditioner for a vehicle using an electromagnetic clutch according to an embodiment of the present invention.

Hereinafter, an embodiment of the present invention will be described with reference to the accompanying drawings. FIG. 1 schematically shows a front portion of a vehicle. An engine room 2 is provided in the front portion.

An engine 4 is transversely disposed within the engine room 2. A radiator 8 and an electric fan 10 are respectively disposed between the engine 4 and a front grill 6 of the room 2. When the fan 10 is driven, the outside air is introduced into the radiator 8 through the grill 6, and cooling water of the engine 4 is cooled through the heat exchange within the radiator 8.

The vehicle concerned is provided with an air conditioner which includes a refrigerating circuit 12. The circuit 12 has a path for a $CO_2$ refrigerant or an alternate refrigerant HFC-152a as a natural refrigerant (hereinafter referred to as "a refrigerant" for short). The refrigerant can circulate through this path, so that a temperature within a driving room 14 is adjusted at a desired set temperature. More specifically, a compressor 20, a condenser 22, a receiver 24, an expansion valve 26, and an evaporator 28 are insertionally provided in this order from an upstream side in the path concerned. In addition, the compressor 20, the condenser 22, the receiver 24, and the expansion valve 26 are disposed within the room 2, and the evaporator 28 is disposed within an installment panel 18 which is provided on the front side of the assistant driver's seat. The panel 18 and the room 2 are partitioned by a dash panel 16.

The compressor 20 of this embodiment is connected to the engine 4 through the motive power transmitting path 30, and operated by receiving the motive power from the engine 4. More specifically, the transmitting path 30 includes an output pulley 32 installed in the engine 4 side, a driving pulley 34 installed on the compressor 20 side, and a driving belt 40 suspended between the pulley 32 and the pulley 34.

Figure 2:
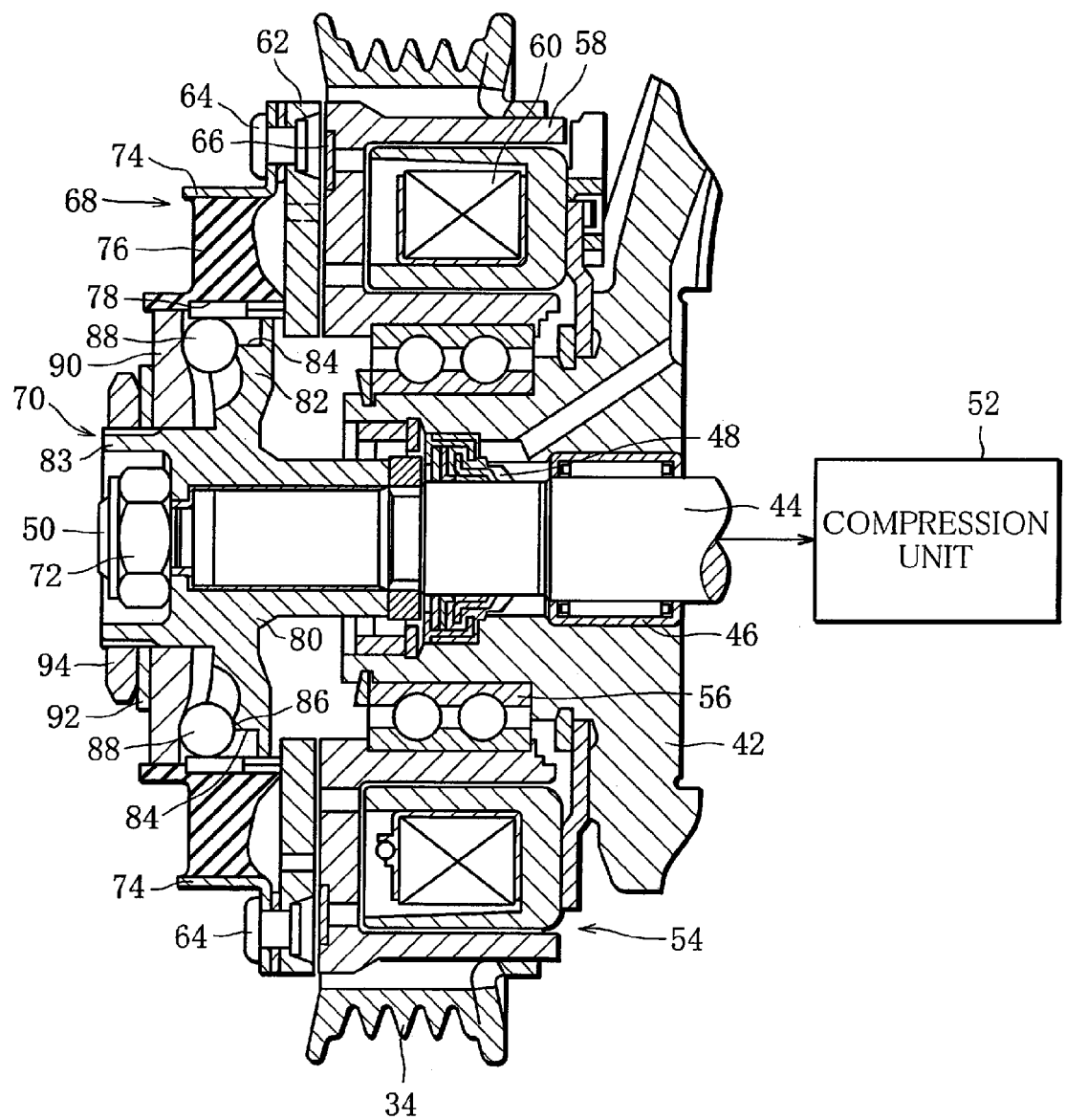
FIG. 2 is a cross sectional view showing an electromagnetic clutch according to a first embodiment of the present invention.

FIG. 2 shows a part of the compressor 20 incorporated in the above-mentioned air conditioner. Hereinafter, an electromagnetic clutch 54 according to a first embodiment of the present invention will be described.

The compressor 20 includes a housing 42, and a drive shaft 44 is disposed inside the housing 42. The drive shaft 44 is rotatably supported by the housing 42 through a bearing 46. In addition, the drive shaft 44 has one end 50 projecting from the housing 42 through a lip seal 48. On the other hand, the other end of the drive shaft 44 is connected to a compression unit 52. Even if the compression unit 52, for example, is either of a piston reciprocating motion type or of a scroll type, the compression unit 52 is driven by the rotation of the drive shaft 44 to perform the processes of suction, compression and discharge of a refrigerant for the air conditioner.

The driving pulley 34 is disposed outside the housing 42, and rotatably supported by the housing 42 through a bearing 56. The pulley 34 has the electromagnetic clutch 54 built therein. The electromagnetic clutch 54 includes a rotor 58, and an electromagnetic solenoid 60 is provided within the rotor 58. A current which is caused to flow through the solenoid 60 is controlled, whereby a clutch plate (armature) 62 which is disposed so as to face the rotor 58 is frictionally engaged with a friction liner 66 of the rotor 58, or separated away from the engagement with the liner 66.

In addition, a clutch plate 62 is connected to a torque limiter 70 through a spring member (elastic member) 68. More specifically, the spring member 68 includes an outer ring 74 made of metal, a spring 76 provided inside the outer ring 74, and a plurality of ball engaging grooves 78 to be described later which are provided in a plurality of portions of the inner side of the spring 76, respectively. The outer ring 74 is coupled to the plate 62 with a rivet 64, and the spring 76 is coupled to the torque limiter 70.

The torque limiter 70 is fastened to one end 50 of the drive shaft 44 through a nut 72. The torque limiter 70 is disposed coaxially with the drive shaft 44, and thus rotated integrally with the drive shaft 44. When the current is caused to flow through the solenoid 66 to turn ON the electromagnetic clutch 54, the plate 62 is attracted to the rotor 58 to be frictionally engaged with the rotor 58. Then, the rotation of the rotor 58 is transmitted to the torque limiter 70 through the clutch plate 62 and the spring member 68. As a result, the torque limiter 70 is rotated integrally with the driving pulley 34. That is, the electromagnetic clutch 54 including the torque limiter 70 rotates the drive shaft 44 of the compressor 20 by receiving the motive power of the engine 4.

Now, when the gall or lock state is caused in the drive shaft 44, the electromagnetic clutch 54 of this embodiment is perfectly separated into two parts with the spring member 68 and the limiter 70 as a boundary. More specifically, there is released the connection between the clutch plate side including the rotor 58, the solenoid 60, the plate 62, and the spring member 68, and the drive shaft side including the limiter 70 and the drive shaft 44. Then, the electromagnetic clutch 54 includes a function of prohibiting the connection between the clutch plate side and the drive shaft side from being recovered unless the lock state is released.

More specifically, the limiter 70 includes a hub 80 which is engaged and connected integrally with the drive shaft 44. The hub 80 is coupled to a flange 82 which extends in a circumferential direction of the drive shaft 44, i.e., toward an inner periphery side of the spring member 68. In addition, the flange 82 has a cylindrical head portion 83 which projects in an axial direction of the drive shaft 44. The nut 72 is disposed inside the head portion 83. On the other hand, an outer periphery side of the head portion 83 is engaged with a plate 90. A space adapted to accept a plurality of spherical members (transmission cutting-off portion) 88 which were subjected to a surface treatment is defined between the plate 90 and the flange 82. The plate 90 is fixed to the nut 94 through a washer 92.

Moreover, an outer periphery end of the flange 82 which extends toward the spring member 68 includes a plurality of ball engaging grooves 84 which are disposed so as to face a plurality of ball engaging grooves 78 of the spring member 68, respectively. When the motive power is transmitted from the engine 4, spherical members 88 are engaged with both the engaging grooves 78 and the engaging grooves 84 in a radial direction of the drive shaft 44 to connect the clutch plate side and the drive shaft side, i.e., the spring member 68 and the flange 82 to each other. Thus, during the normal operation of the compressor 20, the motive power of the engine 4 is transmitted to the drive shaft 44 through the pulley 34, the rotor 58, the plate 62, the engaging grooves 78 of the spring member 68, the spherical members 88, the engaging grooves 84 of the flange 82, and the hub 80.

On the other hand, in the flange 82, an annular evacuation portion (transmission cutting-off portion) 86 projecting toward the plate 90 is provided inside the engaging grooves 84. When the transmission of the motive power from the engine 4 is cut off, the spherical members 88 are engaged with both the evacuation portion 86 and the plate 90 in an axial direction of the drive shaft 44 to release the connection between the clutch plate side and the drive shaft side. That is to say, when the gall or lock state is caused in the drive shaft 44 of the compressor 20, a large difference in rotating speed occurs between the drive shaft side and the clutch plate side. As a result, since a large torque acts on the clutch plate side, the limiter 70 functions. More specifically, the spherical members 88 move toward an axial center of the drive shaft 44 having a low rotating speed. Hence, the engagement with the engaging grooves 78 and the engaging grooves 84 is released, so that the spring member 68 and the flange 82 of the limiter 70 are perfectly separated from each other. As a result, though the motive power of the engine 4 is transmitted up to the spring member 68 to rotate the clutch plate side, it is not transmitted to the flange 82 and thus the drive shaft side is not rotated.

Next, when the spherical members 88 have moved from the ball engaging grooves 84 toward the evacuation portion 86, the lock state or the like of the drive shaft 44 is released. In other words, the connection between the clutch plate side and the drive shaft side is not recovered unless after the operation of the compressor 20 is stopped and the drive shaft 44 is adjusted, the rotating speed of the drive shaft side increases so that the spherical members 88 continue to be biased toward the spring member 68 due to its centrifugal force.

Here, a state in which the limiter 70 functions and the connection between the clutch plate side and the drive shaft side is released can be detected, for example, with a rotating speed sensor for detecting the rotating speed of the drive shaft 44. Considering the fact that no refrigerant circulates unless the compressor 20 operates, a pressure sensor for detecting a change in pressure of the refrigerant circulating in the refrigerating circuit 12, or means for detecting various connection states just like a temperature sensor for detecting a change in temperature of the refrigerant may also be adopted instead of the rotating speed sensor.

When receiving as an input a detection signal indicating the release of the connection between the clutch plate side and the drive shaft side from the detecting means, an electronic control unit (ECU) 98 provided within the panel 18 of the vehicle causes the current to flow through the solenoid 60 to make the rotor 58 attract the plate 62. Also, the ECU 98 displays that the connection is released by using a lamp, a buzzer 100 or the like to make a crew member call his/her attention to that effect.

According to the electromagnetic clutch 54 of the first embodiment described above, the torque limiter 70 includes the evacuation portion 86 and the spherical members 88 which prohibit the motive power of the engine 4 from being transmitted to the drive shaft 44 unless the gall or lock state of the drive shaft 44 is released. That is to say, in the lock state or the like, the spherical members 88 move toward the evacuation portion 86 to perfectly separate the spring member 86 from the flange 82 to prohibit the connection between the spring member 86 and the flange 82 from being recovered. Hence, for example, it is possible to reliably avoid the damage of the housing 42 of the compressor 20 caused by the heavy lock state. As a result, even when the combustible refrigerant or $CO_2$ refrigerant is used, the refrigerant can be prevented from being discharged from the compressor 20 into the atmosphere without improving the housing 42, which contributes to the improvement of the reliability of the refrigerating system.

In addition, since the limiter 70 and the spring member 68 are disposed in the radial direction of the drive shaft 44, and the spring member 68 is connected to the plate 62, the torque fluctuation generated in the engine 4 is sufficiently absorbed.

Moreover, since the limiter 70 has the mechanical construction, more specifically, the spherical members 88 for the engagement between the spring member 68 and the flange 82, the influence of changes over time becomes less as compared with the case where the elastic member is used in the torque limiter as in the prior art. Furthermore, since the movement of the spherical members 88 allows the transmission of the motive power from the engine 4 to be cut off, the torque fluctuation when the transmission phase is changed over to the cut-off phase becomes small.

In addition, when the limiter 70 functions, the plate 62 is attracted to the rotor 58 to avoid the non-supporting state of the plate 62 and the spring member 68 after movement of the spherical members 88. As a result, the work for searching for the plate 62 and the spring members 68 becomes unnecessary, and thus the process for recovering the compressor 20 is prevented from being complicated. In addition, if it is detected that the current is continuously caused to flow through the solenoid 60, it also becomes possible to recognize the release of the state of the connection between the clutch plate side and the drive shaft side. Then, when the release of the connection state is detected, and the crew member clearly recognizes the detection results, the lock state caused in the compressor 20 is released in early stages, and the reliability of the refrigerating system is further improved.

The present invention is not limited to the first embodiment described above, and the various changes can be made. An electromagnetic clutch according to a second embodiment of the present invention will hereinafter be described with reference to FIG. 3. In describing the second embodiment, the same members and portions as those of the first embodiment are designated with the same reference numerals, and a description thereof is omitted here.

Figure 3:
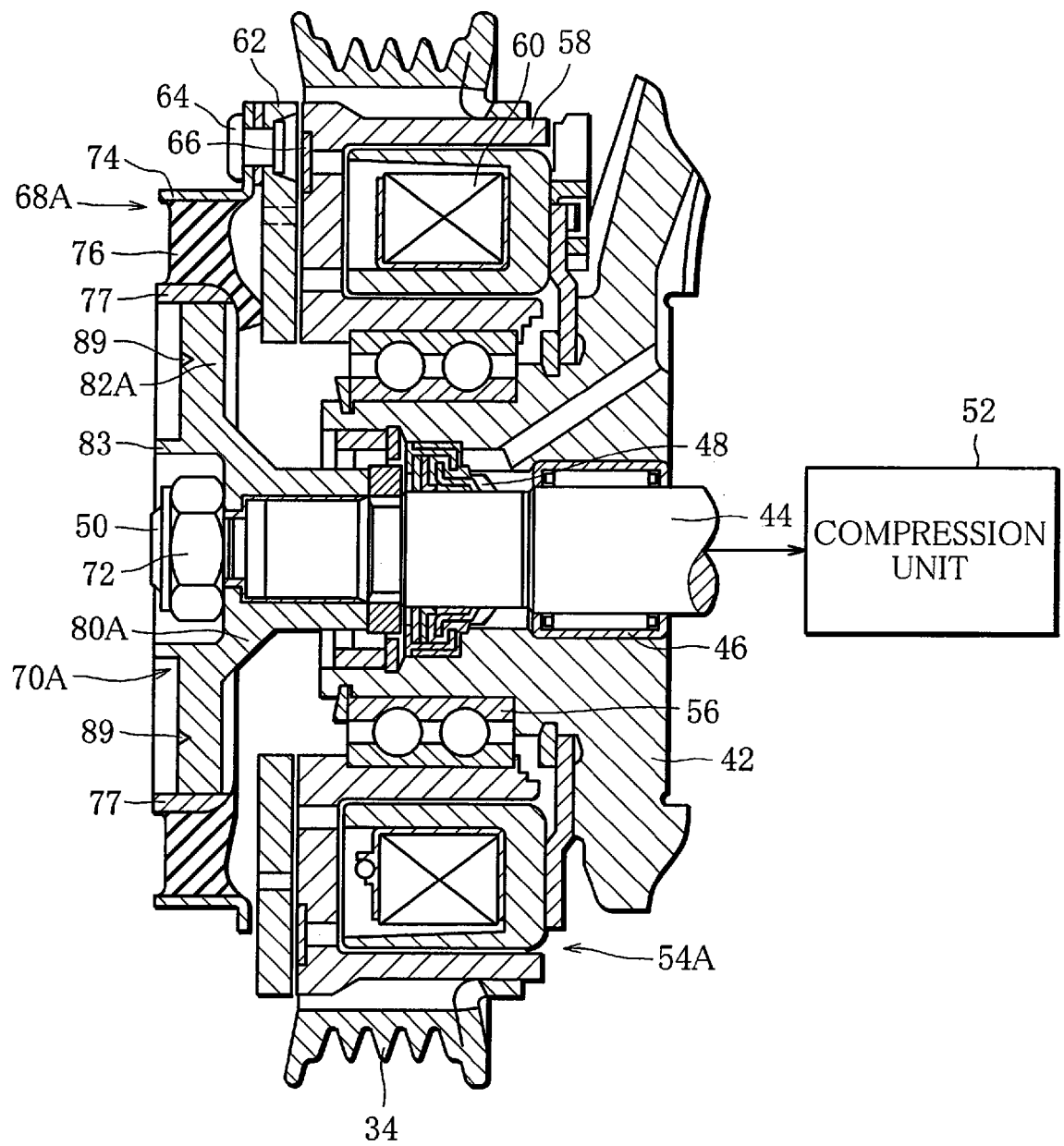
FIG. 3 is a cross sectional view showing an electromagnetic clutch according to a second embodiment of the present invention.

In a torque limiter 70A of an electromagnetic clutch 54A of the second embodiment 2 shown in FIG. 3, a flange 82A which extends toward an inner ring 77 made of metal of a spring member 68A is connected to a hub 80A. A notch portion (transmission cutting-off portion) 89 for breaking the flange 82A when the transmission of the motive power from the engine 4 is cut off is provided instead of the spherical members 88 described above in the flange 82A.

As described above, in the electromagnetic clutch 54A of the second embodiment, the limiter 70A has a physical construction, i.e., a notch portion 89 provided in the flange portion 82A, and perfectly separates the clutch plate side from the drive shaft side. As a result, there are offered the same operations and effects as those of the electromagnetic clutch 54 of the first embodiment. Moreover, the influence of changes over time is less, and the number of components or parts is reduced as compared with the case where the elastic member is used in the torque limiter as in the prior art. Furthermore, when the release of the state of the connection between the clutch plate side and the drive shaft side is detected, and the crew member clearly recognizes the detection results, the release of the state of a lock caused in the compressor 20 and the exchange of the plate 62 for new one in early stages are facilitated.

In addition, in the electromagnetic clutches 54 and 54A of the first and second embodiments, sensors able to detect the release of the state of the connection between the clutch plate side and the drive shaft side may be connected between the spring members 68 and 68A, and the limiters 70 and 70A, respectively. In this case, the release of the state of the connection between the clutch plate side and the drive shaft side can be directly detected without using the rotating speed sensor, the pressure sensor and the temperature sensor.

Moreover, as regards a method of holding the plate 62 after the release of the connection state, the back surface of the plate 62 and the bearing 56 may be connected through a spring. In this case as well, it is possible to avoid the non-supporting state of the plate 62.

Further, the rotor 58 may be one which is rotated by receiving the motive power from a motor (not shown) in addition to one which is rotated about the drive shaft 44 by receiving the motive power from the engine 4.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electromagnetic clutch comprising:
    a drive shaft of a compressor in an air conditioner for a vehicle in which a combustible refrigerant or a $CO_2$ refrigerant circulates;
    a rotor adapted to be rotated about said drive shaft by receiving a motive power from an engine or a motor of said vehicle;
    an armature disposed so as to face said rotor;
    an electromagnetic solenoid for making said rotor attract said armature by causing a current to flow therethrough and transmitting the motive power to said drive shaft; and
    a torque limiter connected to said armature through an elastic member and adapted to be rotated integrally with said drive shaft,
    wherein said torque limiter is provided with a transmission cutting-off portion for, when the state of a lock is caused in said drive shaft, perfectly separating the armature side from the drive shaft side, and for, unless the lock state is released, prohibiting the connection between the armature side and the drive shaft side from being recovered.

2. The electromagnetic clutch according to claim 1, wherein said torque limiter comprises: a hub connected integrally with said drive shaft; a flange connected to said hub and said flange extending toward said elastic member; and spherical members provided as the transmission cutting-off portion in said flange for, when the motive power is transmitted, being engaged with both said flange and said elastic member, and for, when the transmission of the motive power is cut off, being released from the engagement with said elastic member, thereby perfectly separating said elastic member from said flange.

3. The electromagnetic clutch according to claim 1, wherein said torque limiter comprises: a hub connected integrally with said drive shaft; a flange connected to said hub and extending toward said elastic member; and a notch portion provided as the transmission cutting-off portion in said flange for, when the transmission of the motive power is cut off, breaking said flange, thereby perfectly separating said elastic member from said flange.

4. The electromagnetic clutch according to claim 2, further comprising means for detecting the state of connection between said elastic member and said flange,
    wherein when the state of connection between said elastic member and said flange is released, a current is caused to flow through said electromagnetic solenoid so that said rotor attracts said armature.

5. The electromagnetic clutch according to claim 4, wherein said means for detecting the connection state is means for detecting the rotating speed of said drive shaft, means for detecting a change in pressure of said circulating refrigerant, or means for detecting a change in temperature of said circulating refrigerant.

6. The electromagnetic clutch according to claim 4, further comprising means for displaying to a crew member that the connection between said elastic member and said flange is released in response to a release signal provided by said means for detecting the connection state and indicating the release of the connection state between said elastic member and said flange.

7. The electromagnetic clutch according to claim 3, further comprising means for detecting the state of connection between said elastic member and said flange, wherein when the state of connection between said elastic member and said flange is released, a current is caused to flow through said electromagnetic solenoid so that said rotor attracts said armature.

8. The electromagnetic clutch according to claim 7, wherein said means for detecting the connection state is means for detecting the rotating speed of said drive shaft, means for detecting a change in pressure of said circulating refrigerant, or means for detecting a change in temperature of said circulating refrigerant.

9. The electromagnetic clutch according to claim 7, further comprising means for displaying to a crew member that the connection between said elastic member and said flange is released in response to a release signal provided by said means for detecting the connection state and indicating the release of the connection state between said elastic member and said flange.

* * * * *